US010019518B2

(12) United States Patent
Chen et al.

(10) Patent No.: US 10,019,518 B2
(45) Date of Patent: Jul. 10, 2018

(54) METHODS AND SYSTEMS RELATING TO RANKING FUNCTIONS FOR MULTIPLE DOMAINS

(75) Inventors: Jiang Chen, Santa Clara, CA (US); Wei Chu, Sunnyvale, CA (US); Zhenzhen Kou, Santa Clara, CA (US); Zhaohui Zheng, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 1694 days.

(21) Appl. No.: 12/577,045

(22) Filed: Oct. 9, 2009

(65) Prior Publication Data

US 2011/0087673 A1 Apr. 14, 2011

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
CPC .................................................. G06F 17/30864
USPC ........................................................ 707/748
See application file for complete search history.

(56) References Cited

U.S. PATENT DOCUMENTS

| | | | |
|---|---|---|---|
| 7,219,090 B2 * | 5/2007 | Travis, Jr. | |
| 7,647,314 B2 * | 1/2010 | Sun et al. | 707/742 |
| 7,734,633 B2 * | 6/2010 | Liu | G06F 17/30864 707/749 |
| 2006/0287980 A1 * | 12/2006 | Liu et al. | 707/2 |
| 2007/0255689 A1 * | 11/2007 | Sun | G06F 17/30864 |
| 2008/0184371 A1 * | 7/2008 | Moskovitch | G06F 21/566 726/24 |
| 2009/0150309 A1 * | 6/2009 | Chapelle et al. | 706/12 |
| 2009/0210407 A1 * | 8/2009 | Freire et al. | 707/5 |
| 2009/0248667 A1 * | 10/2009 | Zheng | G06F 17/30864 |
| 2010/0082617 A1 * | 4/2010 | Liu | G06F 17/30675 707/729 |
| 2010/0153315 A1 * | 6/2010 | Gao et al. | 706/12 |
| 2010/0158470 A1 * | 6/2010 | Tzoukermann et al. | 386/46 |
| 2010/0257167 A1 * | 10/2010 | Liu | 707/731 |
| 2010/0299336 A1 * | 11/2010 | Bergstraesser et al. | 707/759 |
| 2011/0071965 A1 * | 3/2011 | Long | G06N 99/005 706/12 |

OTHER PUBLICATIONS

Cao et al. "Learning to Rank: From Pairwise to Listwise Approach." Proceedings of the 24th International Conference on Machine Learning, Corvallis, OR, 2007. 7 Pages. http://www.machinelearning.org/proceedings/icml2007/papers/139.pdf.*

Chu et al., "Preference Learning with Gaussian Processes", Appearing in Proceedings of the 22nd International Conference on Machine Learning, Bonn, Germany, 2005, 8 pages.

(Continued)

*Primary Examiner* — Kimberly Wilson
(74) *Attorney, Agent, or Firm* — Berkeley Law & Technology Group, LLP

(57) ABSTRACT

Methods and systems are disclosed that relate to ranking functions for multiple different domains. By way of example but not limitation, ranking functions for multiple different domains may be trained based on inter-domain loss, and such ranking functions may be used to rank search results from multiple different domains so that they may be blended without normalizing relevancy scores.

21 Claims, 8 Drawing Sheets

(56) References Cited

OTHER PUBLICATIONS

Friedman, Jerome H., "Greedy Function Approximation: A Gradient Boosting Machine", Feb. 24, 1999, 34 pages.
Zheng et al., "A Regression Framework for Learning Ranking Functions Using Relative Relevance Judgments", SIGIR '07, Amsterdam, The Netherlands, ACM 978-1-59593-597-7/07/0007, Jul. 23-27, 2007, 8 pages.

* cited by examiner

METHODS AND SYSTEMS RELATING TO RANKING FUNCTIONS FOR MULTIPLE DOMAINS

BACKGROUND

1. Field

The subject matter disclosed herein relates to methods and systems relating to ranking functions.

2. Information

The rate at which information is created in the world today continues to increase. There is personal and professional information, public and private information, entertainment and scientific information, governmental information, and so forth. There is so much information that organizing and accessing it can become problematic. Various approaches to data processing strive to overcome such problems.

Thus, data processing tools and techniques continue to evolve. The different evolutions attempt to address how information in the form of data is continually being created or otherwise identified, collected, stored, shared, and/or analyzed. Databases and data repositories generally are commonly employed to contain a collection of information. Communication networks and computing device resources can provide access to the information stored in such data repositories. Moreover, communication networks themselves can become data repositories.

An example communication network is the "Internet," which has become ubiquitous as a source of and repository for information. The "World Wide Web" (WWW) is a portion of the Internet, and it too continues to grow, with new information effectively being added constantly. To provide access to information that is located in and/or that is accessible via such communication networks, tools and services are often provided that facilitate the searching of great amounts of information in a relatively efficient manner. For example, service providers may enable users to search the WWW or another (e.g., local, wide-area, distributed, etc.) communication network using one or more so-called search engines. Similar and/or analogous tools or services may enable one or more relatively localized data repositories to be searched.

A tremendous variety of different types of information are available via, for example, the WWW. So-called "web documents" may contain text, images, videos, interactive content, combinations thereof, and so forth. These different types of web documents may pertain to different domains. Web documents can therefore be formulated in accordance with a variety of different formats. Example formats include, but are not limited to, a HyperText Markup Language (HTML) document, an Extensible Markup Language (XML) document, a Portable Document Format (PDF) document, H.264/AVC media-capable document, combinations thereof, and so forth. Thus, unless specifically stated otherwise, a "web document" as used herein may refer to source code, associated data, a file accessible or identifiable through the WWW (e.g., via a search), some combination of these, and so forth, just to name a few examples. Regardless of the format, content, and/or domain of web documents, search tools and services may attempt to provide access to desired web documents through a search engine.

Access to search engines, such as those provided by YAHOO!® (e.g., via "yahoo[dot]com"), is usually enabled through a search interface of a search service. ("Search engine", "search provider", "search service", "search interface", "search application", etc. are sometimes used interchangeably, depending on the context.) In an example operative interaction with a search interface, a user typically submits a query. In response to the submitted query, a search engine returns multiple search results that are considered relevant to the query in some manner. To facilitate access to the information that is potentially desired by the user, the search service usually ranks the multiple search results in accordance with an expected relevancy (e.g., relevancy score) to the user based on the submitted query, and possibly based on other information as well.

However, with so much information and so many different types of information being available via different data repositories and/or communications networks, such as the WWW, there is a continuing need to refine the search ecosystem to better help a user access the information that he or she is looking for. In short, there is an ongoing need for methods and systems that enable relevant information to be identified and presented in an efficient and comprehendible manner.

BRIEF DESCRIPTION OF DRAWINGS

Non-limiting and non-exhaustive aspects are described with reference to the following figures, wherein like reference numerals refer to like parts throughout the various figures, unless otherwise specified.

DETAILED DESCRIPTION

Figure 1:
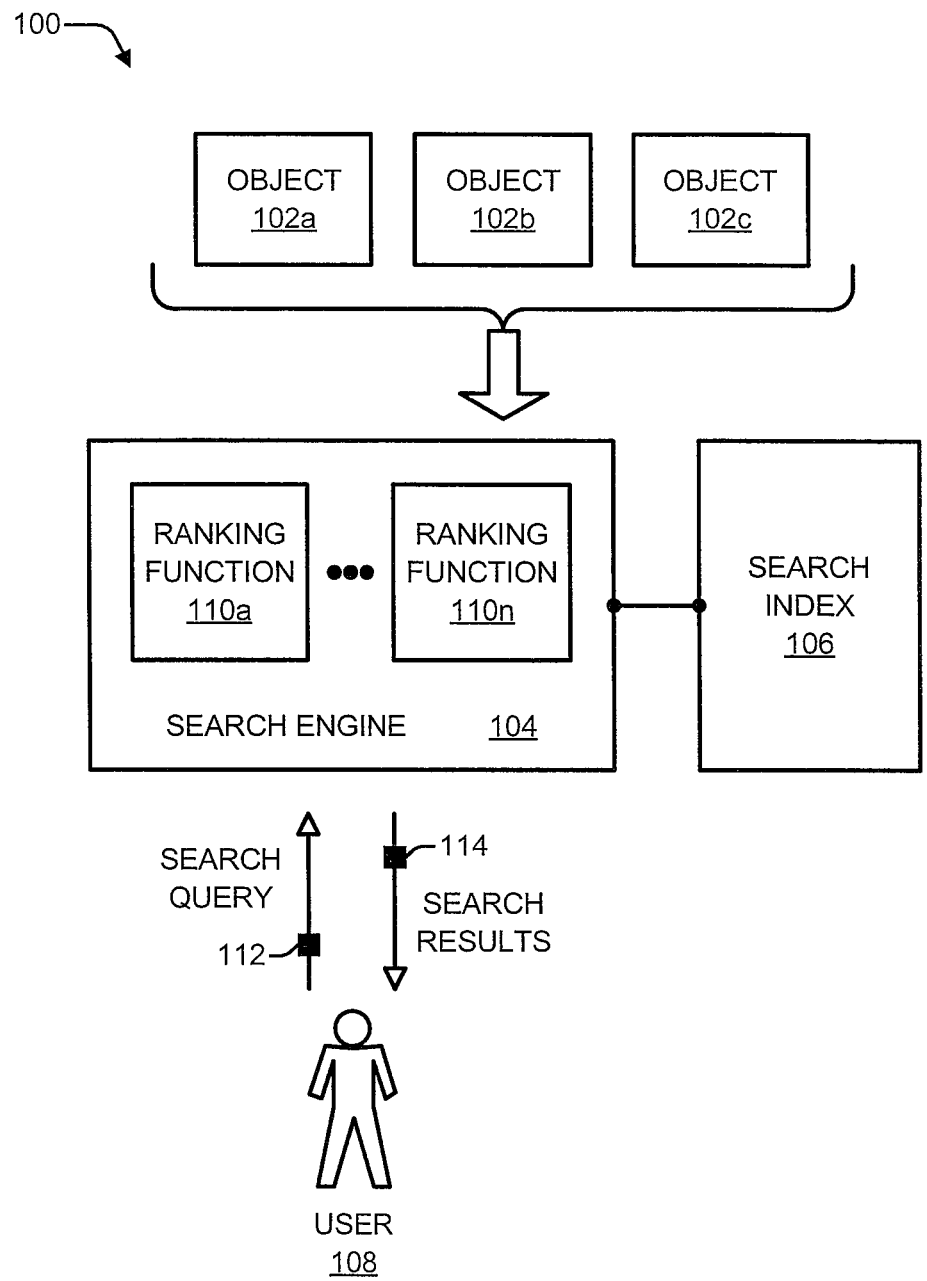
FIG. 1 is a block diagram of an example search paradigm in which ranking functions are used to order search results that correspond to a search query according to an embodiment.

In the following Detailed Description, numerous specific details are set forth to provide a thorough understanding of claimed subject matter. However, it will be understood by those skilled in the art that claimed subject matter may be practiced without these specific details. In other instances, methods, apparatuses, systems, and technologies generally that would be known by a person of ordinary skill in the art have not been described in detail so as not to obscure claimed subject matter.

As noted above, there is an ongoing need for methods and systems that enable relevant information to be identified and presented in an efficient and comprehendible manner so as to help a user access the information that he or she is looking for. Certain example embodiments that are described herein relate to an electronically-realized search service that is capable of ranking relevant search results, including when the search results originate from multiple different domains.

In the context of real search engine applications, a ranking problem is formulated and termed herein "blending." With blending, different instances of ranking lists do not necessarily originate from the same feature space. Instead, they may come from multiple different domains. Consequently, the domains may or may not share features with one other. Assuming, but without loss of generality, that there is a consistent order among instances both within individual domains and across domains, a number of functions, e.g. one for each domain, are sought that can jointly rank the mixture of instances across the multiple domains.

Rather than learning individual ranking functions independently and then blending them afterwards, multiple ranking functions may be "optimized" jointly. The joint learning may be based on inter-domain loss in addition to intra-domain loss. Several specific example learning algorithms with e.g. pairwise loss realizing inter-domain loss on behalf of joint optimization are described herein below. They include two algorithms for linear models and a tree-based algorithm named "GBlend" herein. The first of the two example linear learning algorithms involves Support Vector Machines (SVM). The second utilizes correlations between heterogeneous features from different domains. GBlend, on the other hand, is a gradient boosting algorithm that "optimizes" multiple forests jointly (e.g., "simultaneously").

The emergence of various vertical search engines highlights the fact that a single ranking technology cannot currently adequately deal with the complexity and scale of search problems across different domains. For example, the technology behind video and image search can be very different from that of general web search. Their ranking functions typically share few features. Question-and-answering websites (e.g., YAHOO!® Answer) can make use of text matching and click features that are applicable to general web documents, but they also have unique page structures and tend to posses rich user feedback (e.g., thumbs up and thumbs down ratings in YAHOO!® Answer), which can greatly affect their own ranking. Even for those features that are shared by both question-and-answer web documents and general web documents, the correlation(s) between features and relevance may be quite different. Consequently, dedicated ranking functions are often employed in order to better rank documents within their own individual domains. These dedicated ranking functions are usually defined on distinct feature spaces corresponding to the individual domains.

Nevertheless, presenting one search box for each domain is neither efficient nor scalable. A search user could type the same search query two times into both, e.g., a general search box and a question-and-answer search box and then retrieve two separate ranking lists. However, the search user would likely find it easier to submit a search query but once and then receive a comprehensive list of documents from both domains that pertain to the search terms. An approach to addressing this situation involves blending documents from different domains into a single ranking list. Despite the variety and richness of the content included in the blended list, the included items may still be sorted by relevance into a single ranked list.

Blending may be considered, from one perspective, to entail a ranking problem in which documents originate from more than one domain. Similar to ranking in one domain, it may be assumed, but without loss of generality, that in blending there is a partial order over documents, which is not only defined on documents within a single domain but also across different domains. Such an order may be determined in manner(s) that are similar to those for ranking within a single domain. By way of example but not limitation, preference (e.g., pairwise preference) may be inferred from click-through data in the same way as it is done for single-domain ranking. If we have preference data indications (e.g., relevance labels) for documents, a relevance order may be obtained by making an assumption that the preference data indications are consistent across multiple domains. For instance, if each document is assigned one of five grades (e.g., Perfect, Excellent, Good, Fair, and Bad), it may be assumed that a "Good" general web document is more relevant than a "Fair" image document and that an "Excellent" video document is preferred to a "Good" question-and-answer document, and so forth. However, other ranking order and preference data definitions and/or assumptions may alternatively be adopted without departing from claimed subject matter.

FIG. 1 is a block diagram of an example search paradigm 100 in which ranking functions 110 are used to order search results that correspond to a search query according to an embodiment. As illustrated, search paradigm 100 includes multiple objects 102, a search engine 104, a search index 106, and a user 108. Search engine 104 includes (or at least has access to) multiple ranking functions 110. Search paradigm 100 also involves a search request that includes a search query 112 and a search response that includes search results 114.

More specifically, three objects 102a, 102b, and 102c are shown in FIG. 1. However, a given search paradigm 100 may include fewer or more such objects 102. For a search paradigm that facilitates access to web documents, for example, objects 102 may number in the millions, billions, or more. Two ranking functions 110a and 110n are explicitly shown as being associated with search engine 104. The variable "n", however, represents any integer greater than one (e.g., 2, 3, 4, 5 . . . ). Hence, search engine 104 may use any two or more ranking functions 110.

In an example operation, search engine 104 may consider the available objects 102 and index their contents to produce search index 106. If search query 112 is received (e.g., as electrical digital signals that represents a search request) from user 108, the included search terms may be applied to at least one search index 106 to produce a number of search results that are considered at least somewhat relevant to search query 112. Search engine 104 may operate with one or more search indexes 106, including with different search indexes 106 for different domains. Although search index 106 is shown as being separate from search engine 104, search index 106 may alternatively be fully or partially integrated with search engine 104.

Search engine 104 may use ranking functions 110 to rank (e.g., order) the relevant search results relative to one another. These ranked search results are transmitted to user 108 as search results 114 (e.g., as electrical digital signals over a communication network that represent a search response). It should be noted that a search procedure may be implemented differently from these details without departing from claimed subject matter. Also, objects 102 may be any of web documents, files generally, emails, videos, images, blog entries, some combination thereof, and so forth, just to name a few examples.

In certain example embodiments, different ranking functions 110 are used for objects 102 that correspond to different domains. Objects 102 may have different features that affect how they are ranked when they correspond to (e.g., belong to, are associated with, originate from, etc.) different domains. Examples of different domains are described below with particular reference to FIG. 2.

Figure 2:
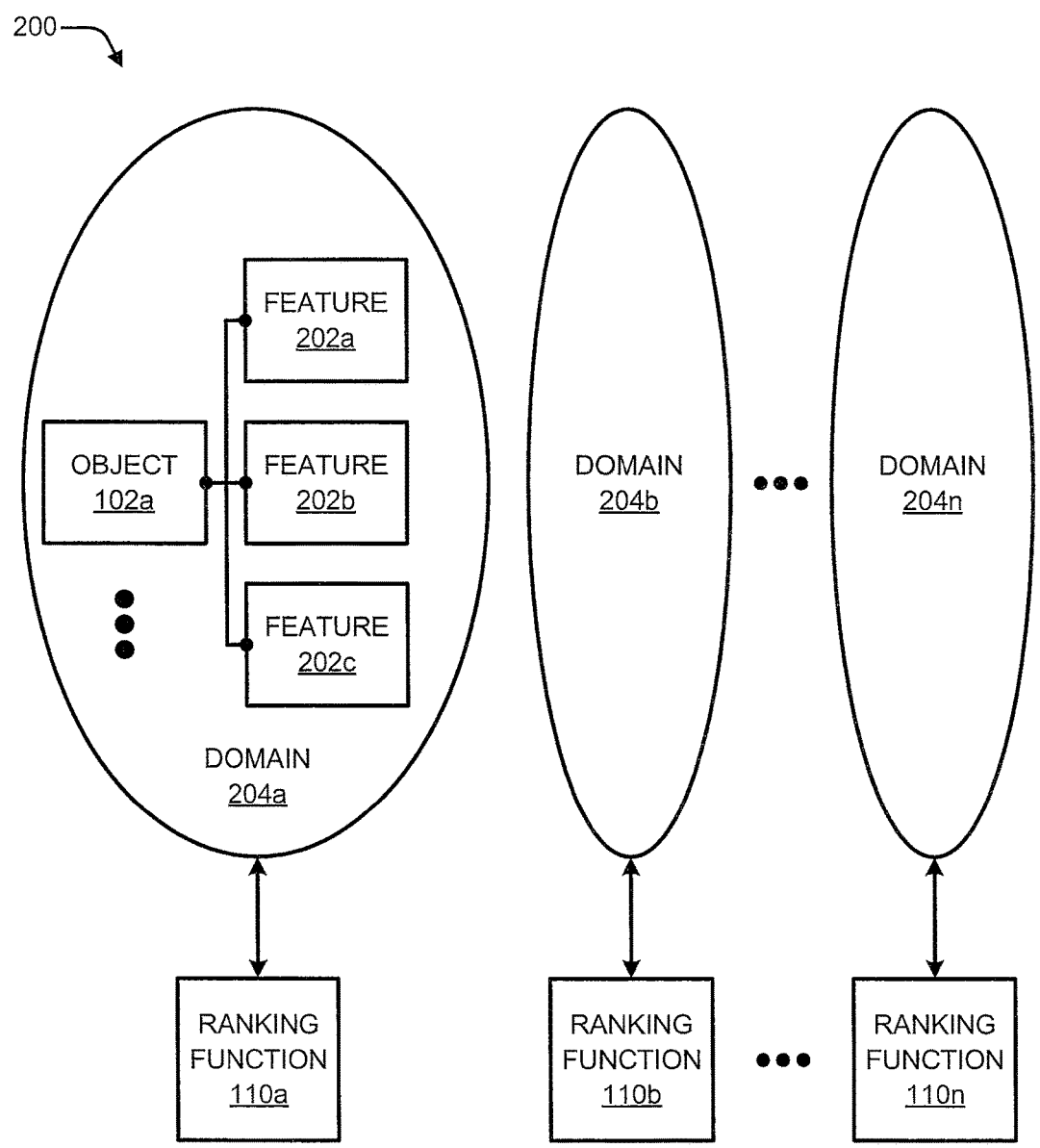
FIG. 2 is a block diagram illustrating example domains of objects and example ranking functions corresponding thereto according to an embodiment.

FIG. 2 is a block diagram 200 illustrating example domains 204 of objects 102 and ranking functions 110 that correspond thereto according to an embodiment. As illustrated, block diagram 200 includes multiple domains 204 and multiple ranking functions 110. Each domain 204 includes multiple objects 102 that are associated with one or more features 202. More specifically, "n" domains 204a, 204b ... 204n and "n" ranking functions 110a, 110b ... 110n are shown, with "n" representing a positive integer of two or greater. Although "n" domains 204 and "n" ranking functions 110 are shown, there need not be a one-to-one correspondence between domains 204 and ranking functions 110. By way of example but not limitation, one ranking function 110 may be applied to two different domains 204.

As shown, domain 204a includes at least one object 102a. However, each domain 204 usually includes multiple, if not many, such objects 102. In block diagram 200, object 102a is associated with three features 202a, 202b, and 202c. However, a given object may be associated with more or fewer such features 202. Typically, at least some of the features 202 of objects 102 may be used to rank them for presentation to a user in response to a search query. Different features 202 and/or groups of features 202 may impact how objects 102 are ranked relative to one another for a given search query. Even if two objects do share one or more common features, if the objects are of different types, then the relevancy scoring and the resulting ranking may be impacted. Consequently, different ranking functions 110 are often used for different object types.

For certain example embodiments, a domain 204 may correspond to objects 102 of the same or similar type. In other words, each domain 204 may correspond to objects 102 with the same or similar features 202 and/or with a same or similar set of features 202. Examples of different types of objects 102 and/or corresponding domains 204 include, but are not limited to, the following for an example WWW embodiment: "standard" web pages, blog pages, question-and-answer pages, images, videos, audio files, forum pages, PDFs, and so forth, just to name a few examples.

Hence, different respective ranking functions 110 may be tuned or configured to rank such different types of objects that populate corresponding respective domains 204. As illustrated, ranking function 110a corresponds to domain 204a and the objects thereof, ranking function 110b corresponds to domain 204b ... ranking function 110n corresponds to domain 204n.

In conventional multi-domain approaches, a search engine determines which search results are considered to be relevant to a search query. Individual objects comprising the relevant search results are then ranked by a respective ranking function 110 that corresponds to a respective domain 204 to which each given object corresponds. For example, objects 102 that comprise blog web documents may be ranked by a particular ranking function 110 that is tuned to rank the features 202 that are typically associated with blog web documents. Similarly, objects 102 that comprise image web documents may be ranked by a particular ranking function 110 that is tuned to rank the features 202 that are typically associated with image web documents.

Each ranking function 110 may associate a relevancy score with each object 102. Multiple ranked lists of search results are thus produced with each object 102 of a given domain 204 having an associated relevancy score. With conventional ranking functions 110, however, relevancy scores generated by different ranking functions 110 may not necessarily interrelate properly with relevancy scores generated by other ranking functions 110. For instance, a blog object with a relevancy score of 0.8 (e.g., with 1.0 being most relevant) may actually be less relevant than an image object with a relevancy score of 0.6. To overcome this problem and still produce a blended set of search results, a score transformation is performed to normalize the relevancy scores. The normalized or transformed relevancy scores may interrelate so that a single ranked listing of search results from multiple different domains is produced.

This score transformation operation consumes time and uses the resources of the search engine system. The score transformation operation could be omitted if the different ranking functions 110 corresponding to multiple different domains 204 were to generate relevancy scores that are sufficiently interrelated. In other words, if the relevancy scores generated by differently-tuned ranking functions 110 properly interrelated, then a single ranked listing of search results could be produced without an additional score normalization operation (e.g., with a simple sorting operation).

Example approaches according to an embodiment for producing ranking functions 110 that enable score normalization to be omitted is described herein further below with particular reference to FIG. 3. However, an example mathematical formulation for blending search results that are ordered by different ranking lists corresponding respectively to different domains is described below.

As described above, a ranking order may be defined for objects using, e.g., five different grades (e.g., Perfect, Excellent, Good, Fair, and Bad). With a ranking order defined, blending may be formulated as a machine learning problem. A characteristic that distinguishes blending from ranking is that blending may involve more than one domain. Each domain may have its own feature space and hence its own ranking function. Even if two domains were to have exactly the same set of features, separate ranking functions may be appropriate for them because the correlations between features and relevance might be very different.

On the other hand, sometimes blending can benefit from the presence of common features, in a manner that is similar to that of multi-task learning. An example algorithm is described below that takes advantage of correlation(s) between and/or among features across different domains, which features may be, but are not necessarily, common features. It is assumed in the relatively rigorous mathematical descriptions presented herein below that no common feature need be shared between different domains; however, the described algorithms and principles are also effective (and may be more effective) when there are one or more common features.

For this example mathematical description, it is given that documents (or more generally objects) are to be blended from k domains $D_1, D_2, \ldots D_k$, where $D_i := R^{n_i}$ is a vector space of dimension $n_i$. Let $f_i : D_i \to R$ be the ranking function for domain i. The example rigorous mathematical descriptions herein focus on pairwise approaches so as not to obscure the principles of claimed subject matter. However, other approaches (e.g., listwise algorithms, etc.) may alternatively be implemented without deviating from claimed subject matter. The symbol "»" denotes a partial order, e.g., x»z if document x is more relevant than document z where x and z may belong to the same domain or to two different domains.

Blending pairwise loss, or merely blending loss for the example mathematical descriptions, is defined as follows:

$$L(f_1, f_2, \ldots, f_k, \gg) = \sum_{\forall x \in D_i, z \in D_j, x \gg z} I(f_i(x) \leq f_j(z)) \quad (1)$$

where I is the indicator function. In general, when i≠j, relevance scores are used that are given by two different functions $f_i$ and $f_j$ to rank x and z. The ranking loss in such cases is termed inter-domain pairwise loss in these mathematical descriptions. When i=j, this example formula for inter-domain pairwise loss devolves to what is termed herein intra-domain pairwise loss. Losses of both kinds can be minimized by minimizing Equation (1).

One potential approach to addressing the blending problem involves independent optimization of the ranking functions. With this approach, individual ranking functions are first learned independently, and then one score transformation is learned for each function (in fact, score transformations may be implemented with k–1 transformation functions for k ranking functions). The transformed scores effectively normalize the scores that are generated by the individual ranking functions. These transformed scores that are generated by the learned transformation functions can then be used to blend the results (e.g., with a standard sorting algorithm). This approach effectively involves two phases.

Thus, the following may be learned for a first phase:

$$\forall i \in [1, k],$$

$$f_i^* = \operatorname*{argmin}_{f_i} L(f_i, \gg) = \operatorname*{argmin}_{f_i} \sum_{\forall x_1, x_2 \in D_i, x_1 \gg x_2} I(f_i(x_1) \leq f_i(x_2))$$

Secondly, a set of transformations is learned for a second phase. They are $y_i: R \to R$ to minimize the following loss:

$$L(\gamma_1(f_1^*), \gamma_2(f_2^*), \ldots, \gamma_k(f_k^*), \gg) = \sum_{\forall x \in D_i, z \in D_j, x \gg z} I(\gamma_i(f_i^*(x)) \leq \gamma_j(f_j^*(z)))$$

Each $y_i$ may be constrained to be a monotonically increasing function (e.g., a linear function with positive slope) so that the transformations are order-preserving for each domain.

This example approach for independent optimization can be further simplified if regression-based algorithms are used. Assuming that each document is assigned a preference label, if each label is mapped to a real number and $f_i$'s are trained to minimize the regression loss, no extra transformation need be used to blend them because they are regressed on the same set of target values.

Nevertheless, an aspect of the above approaches to consider is that ranking functions may be optimized independently of one another. A ranking function may be selected to reduce or minimize a loss within its corresponding domain.

It should be understood, however, that these independent optimization methods provide only suboptimal solutions, as is evident from the following two observations. As a first observation, the optimal ranking functions for individual domains do not necessarily optimize blending loss, even if the best score transformations for the domains are obtained for the second phase. This is true especially, but not exclusively, if there are multiple queries in the blending problem. An example of this phenomenon is presented in the following paragraphs with reference to Tables 1A and 1B. As a second observation, when the blending loss is zero, the intra-domain pairwise loss for each domain may also be zero. But in general, a set of functions that jointly optimize blending loss are not necessarily the optimal functions for individual domains.

As noted above, individually-optimized ranking functions may not necessarily reduce or mitigate blending loss. An example is presented here with reference to Tables 1A and 1B in which it is shown how optimal functions for individual domains do not necessarily reduce or mitigate blending loss. In this example, there are four documents to blend from each of two domains $D_1$ and $D_2$: $\theta_1, \theta_2, \theta_3, \theta_4$, and $\pi_1, \pi_2, \pi_3, \pi_4$, respectively. The eight documents can be partitioned into two ranking lists: $\theta_1, \theta_2$ and $\pi_1, \pi_2$ are from $Q_1$, and $\theta_3, \theta_4$ and $\pi_3, \pi_4$ are for $Q_2$.

Tables 1A and 1B contain the data tables for $D_1$ and $D_2$, respectively, for this example. It is given that an optimal blending list is $\theta_1, \pi_1, \theta_2, \pi_2$ for $Q_1$ and $\pi_3, \theta_3, \theta_4, \pi_4$ for $Q_2$. It is also given that the relative orders of $\theta_2, \pi_2$ and $\theta_4, \pi_4$ do not matter.

TABLE 1A

Data for $D_1$.

| Features of $D_1$ | $\theta_1$ | $\theta_2$ | $\theta_3$ | $\theta_4$ |
|---|---|---|---|---|
| A | 1 | 0 | 1 | 0 |
| B | 2 | 0 | 1 | 0 |

TABLE 1B

Data for $D_2$.

| Features of $D_2$ | $\pi_1$ | $\pi_2$ | $\pi_3$ | $\pi_4$ |
|---|---|---|---|---|
| C | 1 | 0 | 1 | 0 |
| D | 1 | 0 | 2 | 0 |

It is therefore apparent that each of the four features alone can minimize the corresponding intra-domain pairwise loss. However, if feature A is selected to rank $D_1$ and feature C is selected to rank $D_2$, no transformation can blend the two sets of four documents without incurring any ranking loss. This is because such a transformation, if one exists, has to map a score of one for $D_2$ to a value both higher and lower than a score of one for $D_1$, which is clearly impossible. However, the blending loss is zero if feature B is selected for $D_1$ and feature D is selected for $D_2$. Although this is a relatively simplistic example, it highlights the fact that no extra information can necessarily help the selection of feature B over A and feature D over C at the time the individual ranking functions are optimized.

Given the two observations that are presented above, as well as the example that is explained above, it becomes apparent that another approach may be relevant to the blending problem. In contrast with independent optimization, joint "optimization" is an alternative approach that is described herein below. In certain example embodiments of joint "optimization", ranking functions corresponding to different domains, which ranking functions may be defined on different feature spaces, are learned substantially simultaneously. They may interact with each other through inter-domain loss (e.g., inter-domain pairwise loss) during the training process. Without considering inter-domain loss some algorithmic implementations may degenerate to independent optimization with relevancy scores that do not properly interrelate. It should be understood that the words "optimization", "optimized", etc. are used by way of example herein to connote optimization in terms of machine learning techniques which typically iterate in an attempt to achieve an "optimal" solution until a predetermined guideline is attained, until sample data is exhausted, until some other criterion is reached, and so forth, just to name a few examples. Hence, a hypothetical, theoretical, or ideal result may not be achieved, but the converged-upon or selected solution may still be considered "optimal" in terms of machine learning algorithms.

Herein below, three example algorithms are described for realizing joint optimization of ranking functions using a relatively rigorous mathematical formulation. For a first example linear function, the blending problem is formulated as an SVM-like optimization problem with both intra-domain and inter-domain pairwise constraints. Using a trick that combines feature spaces, it can be shown that this formulation is analogous to "RankSVM". A second example algorithm that is described for linear functions utilizes the correlations between and/or among features across different domains as inferred by Bayesian techniques. A third, tree-based example algorithm is termed herein "GBlend," and it is developed in accordance with Friedman's gradient boosting decision trees (GBDT) framework. GBlend uses a derivative of "GBRank" for single-domain ranking functions that is adapted to handle multi-domain pairwise loss and to learn multiple forests "simultaneously". It should be understood that the word "simultaneously" is used by way of example herein to connote situations in which multiple ranking functions corresponding to different domains may be addressed within the same iteration of an iterative machine learning algorithm.

Figure 3:
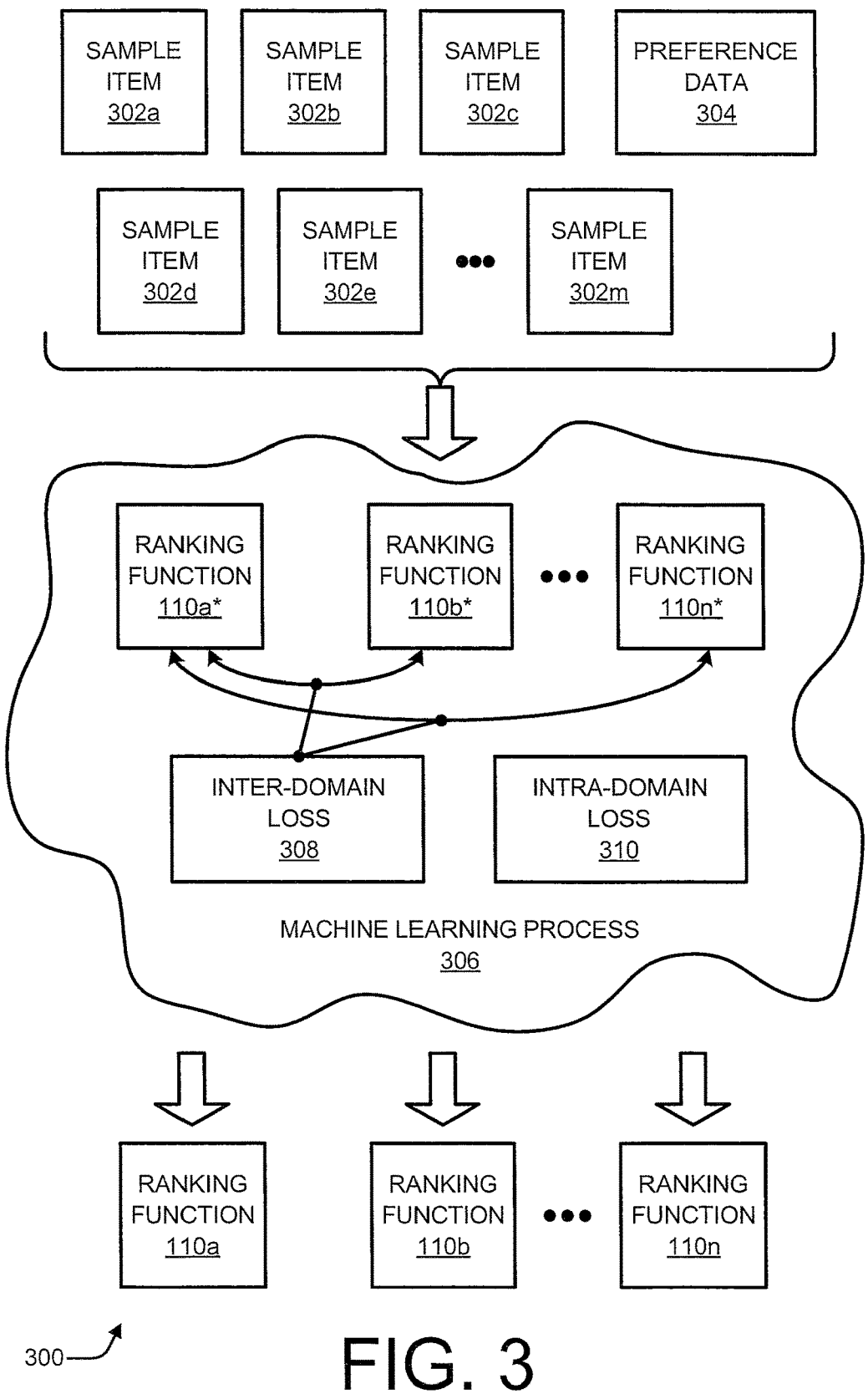
FIG. 3 is a block diagram that depicts a machine learning process in which ranking functions are trained based on inter-domain loss between and/or among two or more domains using sample items that are associated with preference data according to an embodiment.

FIG. 3 is a block diagram 300 that depicts a machine learning process 306 in which ranking functions 110 are trained based at least on inter-domain loss 308 between and/or among two or more domains using sample items 302 that are associated with preference data 304 according to an embodiment. As illustrated, block diagram 300 includes multiple sample items 302, preference data 304, machine learning process 306, inter-domain loss 308, intra-domain loss 310, and ranking functions 110. More specifically, machine learning process 306 includes intermediate versions of ranking functions 110*, and machine learning process 306 produces trained versions of ranking functions 110.

In certain example embodiments, machine learning process 306 is implemented in accordance with at least one machine learning algorithm. Multiple sample items 302 are supplied to machine learning process 306. As shown, "m" sample items 302a, 302b, 302c, 302d, 302e . . . 302m are submitted to the process, with "m" representing a positive integer. A sample item 302 may be equivalent to an object (e.g., an object 102 of FIGS. 1, 2, and 5). A sample item 302 may be associated with one or more preference data 304. Preference data 304 may be grouped together (as shown), may be separately associated with individual preference data 304, some combination thereof, and so forth. Preference data 304 may apply a relevancy, ranking, quality, grading, etc. label to sample items 302.

Sample items 302 may comprise training samples for a machine learning algorithm. As such, they may be preferenced. In other words, they may be associated with preference data 304 after being subjected to one or more preferencing schemes. Preferencing schemes may be manual, such as through an editorial process in which each sample item is judged. Alternatively, preferencing schemes may be automated, such as by analyzing so-called click-through or other user-observed data. Other preferencing schemes may also be implemented to associate preference data with sample items 302.

Using sample items 302 and associated preference data 304, machine learning process 306 may train ranking functions 110 based on inter-domain loss 308. Machine learning process 306 may also train ranking functions 110 based on intra-domain loss 310 as well as inter-domain loss 308. By way of example but not limitation, machine learning algorithms may be implemented iteratively. The different iterations produce intermediate versions of ranking functions 110* until an acceptable level has been attained, until a predetermined criterion has been met, some combination thereof, and so forth. At each iteration, a given intermediate version of a ranking function 110* is produced for each domain 204 (of FIG. 2) of interest. If machine learning process 306 is terminated, a "final" iteration produces trained versions of ranking functions 110.

For machine learning algorithms generally, a loss implies a failure by the learned machine. More specifically, a loss implies an improper relevancy ranking between and/or among two or more items being ranked by a given (e.g., intermediate or final trained) ranking function 110. With conventional approaches, such losses during training are determined with respect to items that are ranked by the same ranking function within a single domain (e.g., using intra-domain loss 310). In contrast, inter-domain loss 308 pertains to a loss that reflects an imperfect and/or an incorrect relative ranking with respect to two or more items that are ranked by different ranking functions 110 between and/or among different domains. Hence, training in accordance with certain example embodiments is based on inter-domain loss that reflects when items from different domains are not ranked properly with respect to each other (including one another). Training in accordance with certain example embodiments may also be based on intra-domain loss that reflects when items from the same domains are not ranked properly with respect to each other (including one another).

Inter-domain loss 308 may be formulated to reflect an incorrect ranking with respect to at least two sample items that correspond to different domains of multiple different domains. Examples of inter-domain loss 308 include, but are not limited to: pairwise loss, Discounted Cumulative Gain (DCG) loss, and so forth, just to name a few examples. By basing the training of ranking functions 110 on, at least partially, inter-domain loss 308, relevancy scores subsequently generated by such ranking functions 110 properly interrelate without using a score transformation. In other words, score normalization may be "baked into" the trained versions of ranking functions 110 by considering inter-domain loss 308 during the training procedure of machine learning process 306.

Figure 4:
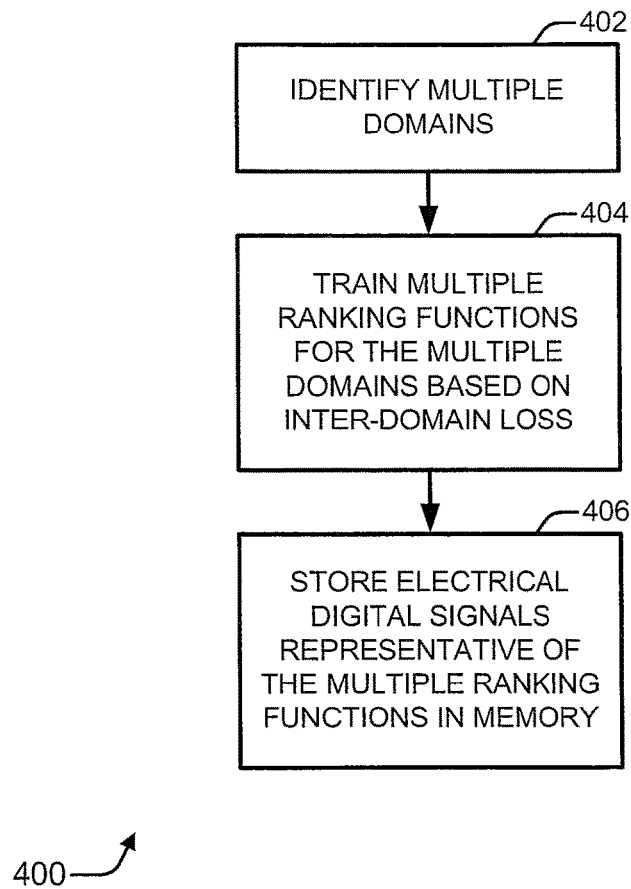
FIG. 4 is a flow diagram that illustrates an example method for producing ranking functions for multiple domains based on inter-domain loss according to an embodiment.

FIG. 4 is a flow diagram 400 that illustrates an example method for producing ranking functions for multiple domains based on inter-domain loss according to an embodiment. As illustrated, flow diagram 400 includes three operations 402-406. The operations may be performed by one or more special-purpose computing devices, examples of which are described herein below with particular reference to FIG. 8 for an embodiment. Although these operations are typically performed at least partially offline (e.g., before a search query arrives or otherwise while a user is not waiting for a response), they may alternatively be performed fully or partially online (e.g., in real-time or near real-time while a user waits for search results). The description below of flow diagram 400 includes references to aspects of other FIGS. (e.g., FIGS. 2 and 3); however, the operations may alternatively be performed by different aspects.

In certain example embodiments, at operation 402, multiple domains are identified. For example, two or more domains 204 may be identified. At operation 404, multiple ranking functions for the multiple domains are trained based on inter-domain loss. More specifically, the multiple ranking functions may be trained using sample items that are associated with preference data, and the inter-domain loss may relate to loss between and/or among at least two domains of the multiple domains. For example, with a machine learning process 306, two or more ranking functions 110 may be trained based on inter-domain loss 308. The two or more ranking functions 110 may be trained, for instance, using sample items 302 that are associated with preference data 304. Machine learning process 306 may, for example, train two or more ranking functions 110 based also on intra-domain loss 310.

Inter-domain loss 308 may relate to loss (e.g., a relative incorrect ranking for two or more items) between and/or among at least two domains 204 of multiple domains 204. At operation 406, electrical digital signals that are representative of the multiple ranking functions are stored in one or more memories. For example, electrical digital signals 816 (of FIG. 8) that are representative of multiple ranking functions 110 may be stored in one or more memories 814 (of FIG. 8).

Figure 5:
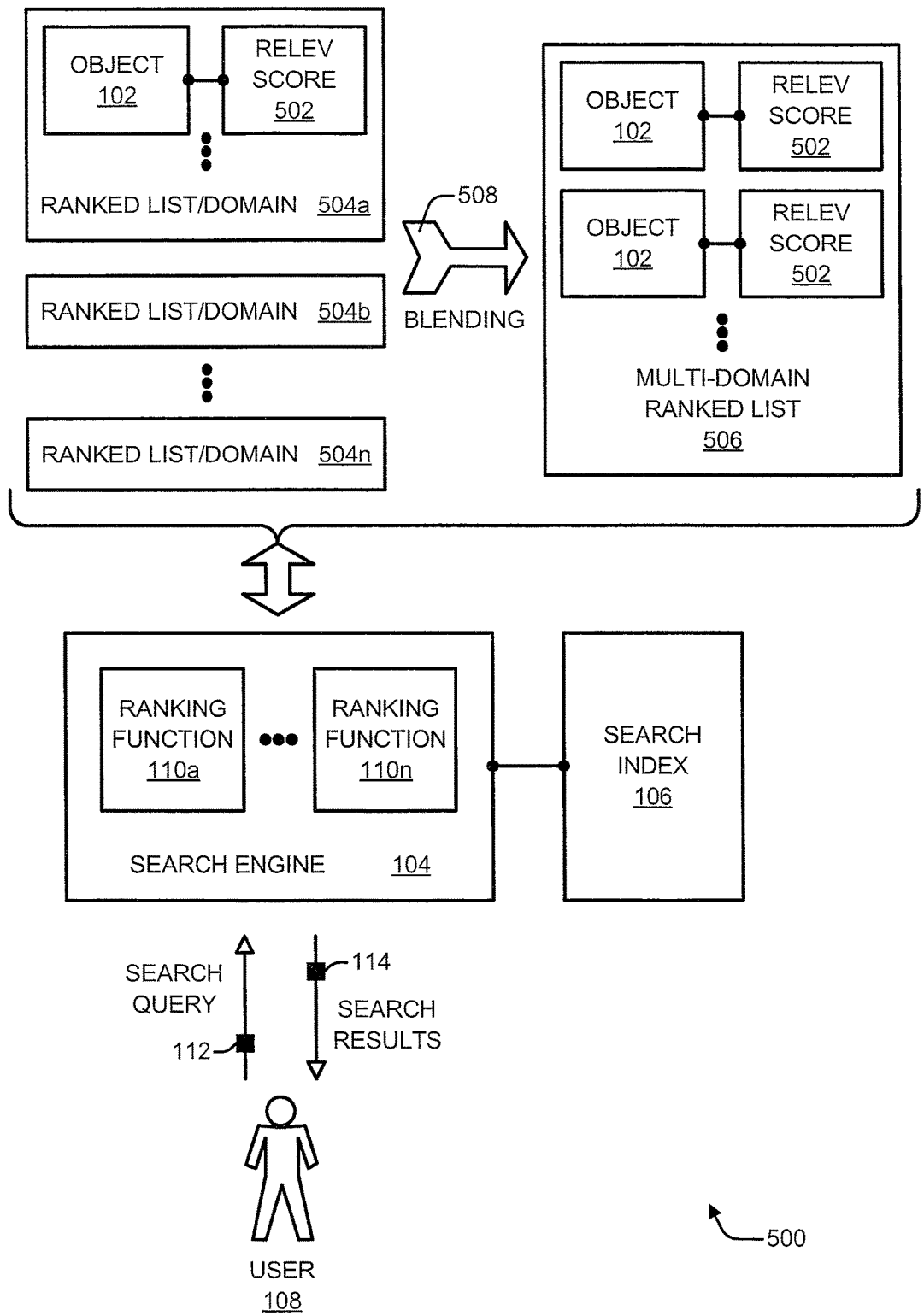
FIG. 5 is a block diagram illustrating an example blending procedure that may be performed to produce a ranked list of search results that are provided for a search query according to an embodiment.

FIG. 5 is a block diagram 500 illustrating an example blending procedure 508 that may be performed to produce a ranked list of search results 114 that are provided for a search query 112 according to an embodiment. As illustrated, block diagram 500 includes (as also shown in FIG. 1) a search engine 104, a search index 106, a user 108, multiple ranking functions 110a . . . 110n, a search query 112, and search results 114. Block diagram 500 also includes relevancy scores 502, multiple ranked lists per domain 504, a multi-domain ranked list 506, and blending procedure 508. As shown, there are "n" ranked lists per domain 504a, 504b . . . 504n, with "n" representing an integer greater than one. However, each domain need not have a ranked list for every search query.

In certain example embodiments, a ranked list for a domain 504 includes a list of objects 102 that are ranked in accordance with their associated relevancy scores 502. In other words, a ranked list for a domain 504 may comprise search results for the corresponding domain. The objects 102 in a ranked list for a domain 504 each correspond to the same given domain. The objects 102 that are included in the multiple ranked lists per domain 504 are blended 508 to form multi-domain ranked list 506. The ordering of objects 102 in multi-domain ranked list 506 may be made in accordance with relevancy scores 502 that are associated with objects 102 in the ranked lists per domain 504 without transforming the scores.

In an example operative implementation, user 108 may submit search query 112 to search engine 104. In conjunction with search index 106, search engine 104 may generate search results from multiple domains that are considered relevant to search query 112. The relevant search results may be applied to multiple ranking functions 110 based on the domain to which each ranking function 110 and the domain to which each search result object correspond. In other words, each object that corresponds to a particular domain (e.g., a question-and-answer domain) may be ranked by a ranking function 110 that corresponds to that particular domain. Ranking functions 110 of search engine 104 may be trained based on inter-domain loss (and also based on intra-domain loss).

A ranking function 110 may generate an associated relevancy score 502 for each object 102 that it is ranking. A respective ranking function 110 may therefore produce a respective ranked list per domain 504. It should be noted that there may not be a one-to-one correspondence between ranking functions 110 and ranked lists per domain 504 (e.g., if no relevant objects are discovered for a particular domain). A ranked list per domain 504 may include an ordered list of search result objects 102 that are ranked in accordance with their associated relevancy scores 502.

If ranking functions 110 of search engine 104 are produced in a machine learning process and are based on inter-domain loss, relevancy scores 502 associated with objects 102 that are present on different ranked lists per domain 504 may properly interrelate with one another. Hence, blending procedure 508 may be effectuated without performing a relevancy score normalization. Blending procedure 508 produces multi-domain ranked list 506 that includes ordered objects 102 that are ranked in accordance with relevancy scores 502 across multiple domains. Multi-domain ranked list 506 may then be provided to user 108 as at least part of search results 114.

Figure 6:
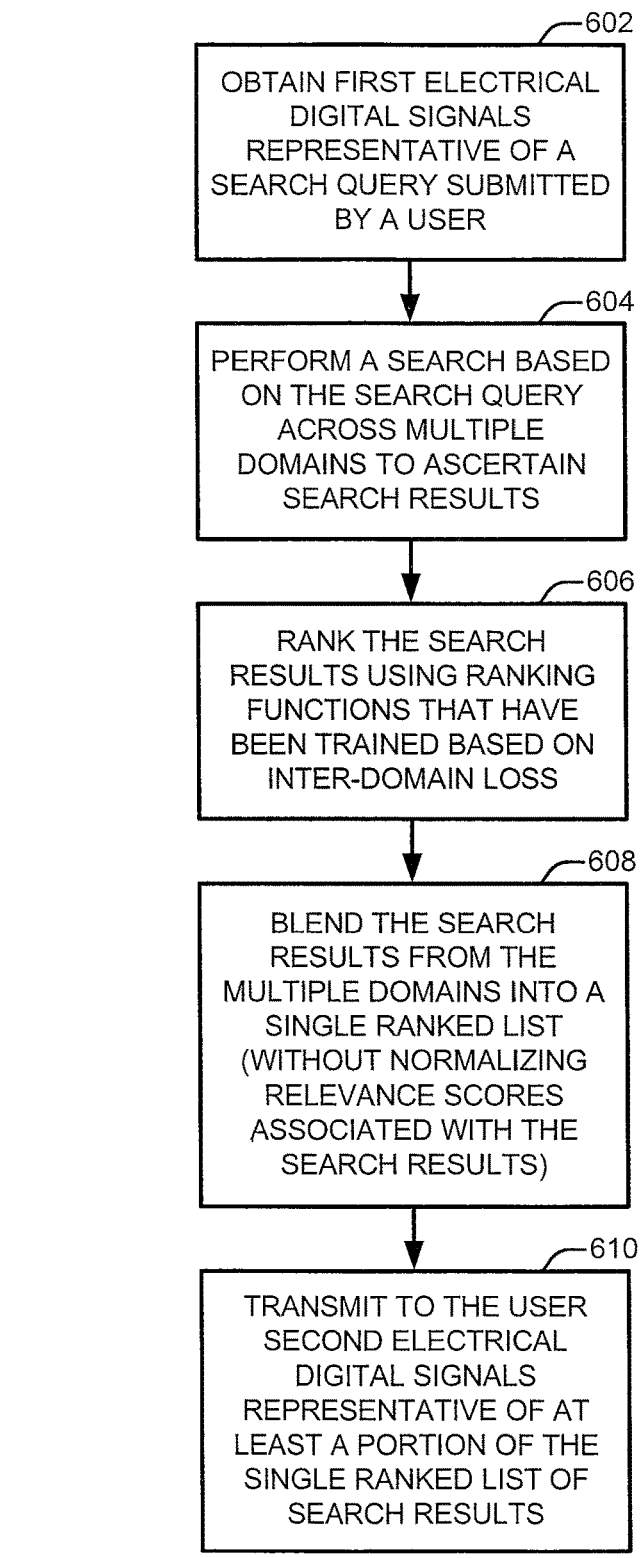
FIG. 6 is a flow diagram that illustrates an example method for using ranking functions for multiple domains, which ranking functions are trained based on inter-domain loss, when blending search results from the multiple domains according to an embodiment.

FIG. 6 is a flow diagram 600 that illustrates an example method for using ranking functions for multiple domains, which are trained based on inter-domain loss, when blending search results from the multiple domains according to an embodiment. As illustrated, flow diagram 600 includes five operations 602-610. The operations may be performed by one or more special-purpose computing devices, examples of which are described herein below for an embodiment with particular reference to FIG. 8. Although these operations are typically performed at least partially online (e.g., in real-time or near real-time while a user waits for search results), they may alternatively be performed fully or partially offline (e.g., at a timescale in which a user is not necessarily awaiting an "immediate" response to a search query). The description below of flow diagram 600 includes references to aspects of other FIGS. (e.g., FIGS. 3 and 5); however, the operations may alternatively be performed by different aspects.

In certain example embodiments, at operation 602, first electrical digital signals representative of a search query that has been submitted by a user are obtained. For example, first electrical digital signals 816 (of FIG. 8), which are representative of a search query 112 that has been submitted by a user 108, may be received via a communication interface, may be retrieved from memory, some combination thereof, and so forth.

At operation 604, a search that is based on the search query is performed across multiple domains to ascertain search results. For example, a search that is based on the terms of search query 112 may be performed by search engine 104 across multiple domains 204 to ascertain relevant search results that correspond to the search query and that are from the multiple domains.

At operation 606, search results are ranked using multiple ranking functions that have been trained based on inter-domain loss (and that may also have been trained based on intra-domain loss). For example, the relevant search results, which correspond to the search query, may be ranked on a per-domain basis using trained versions of ranking functions 110 to produce ranked lists per domain 504. The ranking may associate respective relevancy scores 502 with respective objects 102 of the relevant search results.

At operation 608, the search results from the multiple domains are blended into a single ranked list. The blending may be performed without normalizing the relevance scores that are associated with the search results across the multiple domains. For example, objects 102 of the relevant search results may be blended 508 into a single multi-domain ranked list 506 using relevancy scores 502 that are generated by trained versions of ranking functions 110 without normalizing the relevancy scores associated with the search results across the multiple domains 204.

At operation 610, second electrical digital signals that are representative of at least a portion of the single ranked list of search results are transmitted to the user. For example, second electrical digital signals 816 (of FIG. 8), which are representative of at least a portion of the single multi-domain ranked list 506 of the search results, may be transmitted to user 108.

As introduced above, three example blending algorithms, which are capable of implementing joint optimization, are described in the following paragraphs using a relatively rigorous mathematical formulation. The two linear blending algorithms include an SVM approach and an approach that uses learning feature correlations. The third example blending algorithm pertains to GBDT. It should be understood that any of these three example blending algorithms may be implemented in manners that differ from the specifics described herein without departing from claimed subject matter. Moreover, although these three specific example blending algorithms are described herein, other algorithms may alternatively be implemented without departing from claimed subject matter.

For a first linear blending algorithm, in an example SVM approach, it is given that $f_i(x_i) = w_i \cdot x$ is the linear projection function for domain i. The following quadratic programming formulation may be used to optimize blending loss, as shown in Equation (2):

$$\min_{w_1, w_2, \ldots w_k} \frac{1}{2} \sum_{i=1}^{k} \|w_i\|_2^2 + C \sum_{\forall x \in D_i, z \in D_j, x \gg z} \xi_{xz} \quad (2)$$

subject to $$\forall\, x \in D_i,\, z \in D_j,\, x \gg z,\, w_i \cdot x - w_j \cdot z \geq \tau_{xz} - \xi_{xz}$$

where $\tau_{xz} > 0$ is a predetermined separation between x and z and C is a regularization factor. The variable $\tau_{xz}$ can be a constant one or the difference between the target values of x and z, when they are available. The inter-domain constraints ($i \neq j$) serve to bind the optimization of $w_i$'s. Without these inter-domain constraints, Equation (2) devolves into being analogous to deploying SVM to individual domains.

Equation (2) may be further simplified to a standard SVM learning formulation by concatenating different domains into a unified feature space. For example, each vector $x \in D_i$ may be mapped to a longer vector of size ($n = \sum_{i=1}^{k} n_i$):

$$u_x = (0_1, \ldots, 0_{i-1}, x, 0_{i+1}, \ldots, 0_k)$$

where $0_i$ is a vector of zeros of size $n_i$ (with $n_i$ representing the dimension of $D_i$). The k linear functions can be concatenated into one as:

$$w = (w_1, w_2, \ldots, w_k).$$

After transformation, Equation (2) may be solved using a standard SVM scheme. Moreover, kernelization may be applied to facilitate nonlinear ranking functions.

For a second linear blending algorithm, an example learning feature correlation approach is described. In practice, domains sometimes do share features, and this feature overlap can facilitate learning, especially when the number of training samples is relatively limited. As in the scenario of multi-task learning, the task-specific weight vectors are assumed, without loss of generality, to be correlated.

It should be noted, however, that when applied to the blending problem, multi-task learning approaches have two drawbacks. First, the correlations between common features and preference labels may be rather different for different domains. Second, standard implementations fail to model correlations between features with different names, or heterogeneous features in different domains.

In this example formulation, a relatively extreme case is assumed, without loss of generality, in that features are given to live in dichotomous spaces. Correlations are inferred between the features. A Gaussian process on pairwise preferences is used to model correlations between both common features and heterogeneous features. The posterior distribution of the weights can be evaluated as:

$$p(w | \{x \gg z\}) \propto P(\{x \gg z\} | w) p(w),$$

where $p(w) = N(0, \Sigma)$ with $\Sigma$ being the n×n covariance matrix, and $P(\{x \gg z\} | w)$ is the likelihood of observing such pairwise relations. The variable $\Sigma$ in the prior distribution for w is a block-diagonal matrix, where the diagonal block of each domain is a square matrix, and the entries in off-diagonal blocks are 0. Although there is no correlation between weight variables of different domains in the prior, the observed preference of inter-domain pairs reveals the correlation. By adapting Bayesian inference techniques for model parameter optimization, such as Laplacian approximation, the correlations may be identified, as well as the best point estimation of w in the approximate posterior distribution.

As another example blending algorithm, GBlend is described, which may be implemented in a non-linear fashion. In a standard GBDT framework, given a loss function, one regression tree is built at each iteration to fit the functional gradients. The final function is a forest, which is the sum of the tree outputs. In GBlend, on the other hand, the boosting processes of forests for different domains may be coupled at each iteration. In other words, a tree that is grown in a particular forest for a particular domain at a given iteration is based on other tree(s) that were grown in at least one previous iteration in other forest(s) for other domain(s). For instance, a tree that is grown in a particular forest for a particular domain at a given iteration may be based on each of the other trees that were grown in the immediately previous iteration in the other forests for the other domains of interest. Thus, the functional gradients of each ranking function may be influenced by other functions via inter-domain pairwise constraints.

To facilitate an understanding of multiple-domain GBlend, a single domain version of GBRank that can be used to handle intra-domain pairwise constraints is described first. In an example implementation of GBRank, a pairwise GBDT algorithm is employed that attempts to optimize the following loss for each domain i, as shown in Equation (3):

$$\sum_{\forall x_1, x_2 \in D_i, x_1 \gg x_2} H(f_i(x_1) - f_i(x_2) - \tau_{x_1 x_2})^2 \quad (3)$$

where $H=\max(0,a)$, and $\tau_{X1X2} > 0$ may be defined similarly as that in the example linear algorithms that are described above. Hence, pairwise constraints can be handled with GBRank.

Extending Equation (3) to multiple function scenarios, the following Equation (4) results:

$$\sum_{\forall x \in D_i, z \in D_j, x \gg z} H(f_i(x) - f_j(z) - \tau_{xz})^2. \quad (4)$$

Each pair of x and z contributes the negative gradient components of $\max\{0, f_j(z)-f_i(x)+\tau_{xz}\}$ and $-\max\{0, f_j(z)-f_i(x)+\tau_{xz}\}$ to $f_i(x)$ and $f_j(z)$, respectively.

Another component of an example GBRank algorithm may be to use pairs of the same relevance to perform regularization. Thus, the following regularizer may be included as shown in Equation (5):

$$\sum_{\forall x \in D_i, z \in D_j, x \sim z} (f_i(x) - f_j(z))^2 \quad (5)$$

where $x \sim z$ denotes that x has the same relevance as z. Each tie pair x and z contributes the negative gradient components of $f_j(z)-f_i(x)$ and $f_i(x)-f_j(z)$ to $f_i(x)$ and $f_j(z)$, respectively.

While Equation (4) can maximize separation among different preference grades, Equation (5) can control the variances of documents of the same preference grade. The blending loss function then becomes (4)+β·(5), where β can be found using cross-validation. The functional gradient of $f_i$, denoted by $g_i$, is the sum of all negative gradient components contributed by three kinds of pairs. These three kinds of pairs include those in which the counterpart z is of lower, higher, and equal relevance to x. The functional gradient $g_i$ is given by Equation (6):

$$g_i(x) = \sum_{\forall z \in D_j, x \gg z} \max\{0, f_j(z) - f_i(x) + \tau_{xz}\} + \quad (6)$$

$$\sum_{\forall z \in D_j, z \gg x} \max\{0, f_j(z) - f_i(x) - \tau_{zx}\} + \beta \cdot \sum_{\forall z \in D_j, z \sim x} (f_j(z) - f_i(x))$$

An example GBlend Algorithm is provided below in Table 2 using pseudo-code. As shown by the algorithm, trees of each function $f_i$ are built to fit its own functional gradients $g_i$ using data from its own domain, which is analogous to a standard GBDT algorithm. However, the computation of $g_i$ depends on the functions that share inter-domain pairwise constraints with $f_i$. This is where interactions between functions corresponding to different domains may take place. Because of these interactions, the boosting processes of these functions are synchronized, and the relevancy scores generated by the resulting ranking functions are capable of properly interacting. Without such inter-domain pairwise constraints, GBlend can devolve into k independent GBRank instances.

TABLE 2

GBlend Algorithm Example.
Example GBlend Algorithm:

for i =1 to k do
    Initialize $f_i \leftarrow 0$.
for t =1 to T do
    for i =1 to k do
        Compute $g_i$ using (6).
        Build a regression tree $t_i$ to fit $g_i$.
        $f_i \leftarrow f_i + \eta \cdot t_i$, where $\eta < 1$ is a shrinkage factor.

The above three example machine learning algorithms may be implemented to produce multiple ranking functions for multiple different domains. Thus, learning to blend may be implemented, in certain example embodiments, using SVM, Gaussian processes, and/or GBDT, just to name a few examples. Although the first two algorithms are presented herein above in linear formulations, they can alternatively be kernelized to address non-linear problems without departing from claimed subject matter. The second linear algorithm, employing Gaussian processes, may include the inference of heterogeneous features from inter-domain observations. With GBlend, which may be considered an addition to the GBDT family, the boosting processes of multiple forests may be coupled and synchronized to optimize a single objective. Although the example formulations described above are presented in terms of pairwise learning, other loss functions may alternatively be employed on behalf of inter-domain search result blending without departing from claimed subject matter.

Figure 7:
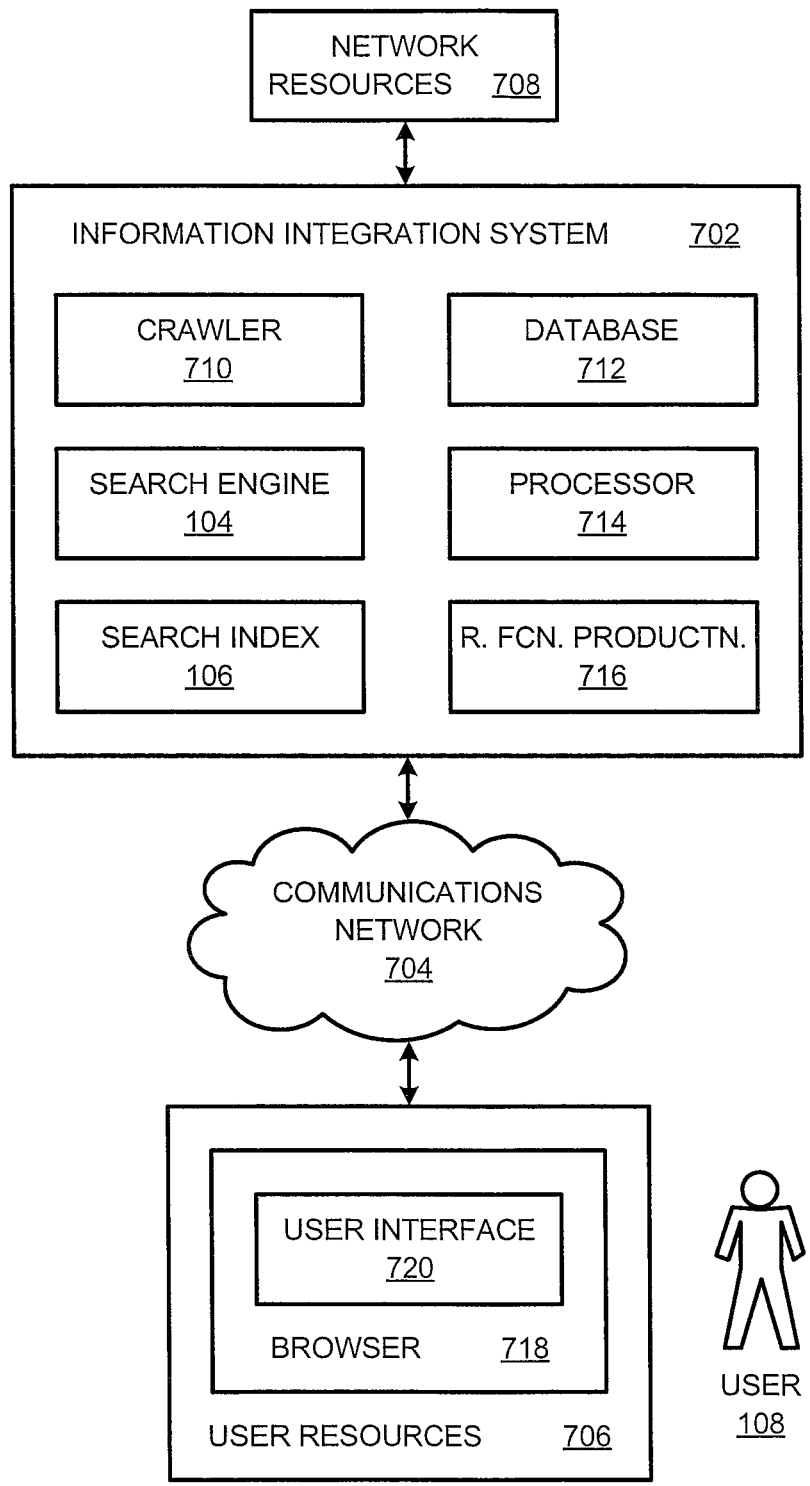
FIG. 7 is a schematic block diagram of systems, devices, and/or resources of an example computing environment, which includes an information integration system that is capable of working with ranking functions for multiple domains according to an embodiment.

FIG. 7 is a schematic block diagram of systems, devices, and/or resources of an example computing environment 700, which includes an information integration system 702 that is capable of working with (e.g., producing, using, etc.) ranking functions for multiple domains according to an embodiment. As illustrated, computing environment 700 includes information integration system 702, one or more communication network(s) 704, one or more user resource(s) 706, network resources 708, and a user 108. Information integration system 702 includes a crawler 710, a search engine 104, a search index 106, a database 712, at least one processor 714, and ranking function production instructions 716. Although information integration system 702 is shown as including one each of components 104, 106, and 710-716, it may alternatively include more (or none) of such components. User resources 706 include at least one browser 718, which may present user interface 720. Information integration system 702 and user resources 706 may alternatively include more, fewer, and/or different components than those that are shown without deviating from claimed subject matter.

In example embodiments, information integration system 702 and user resources 706 may be in communication with one another via communication network 704. The context in which an information integration system 702 may be implemented may vary. By way of example but not limitation, an information integration system 702 may be implemented for public or private search engines, job portals, shopping search sites, travel search sites, RSS (Really Simple Syndication)-based applications and sites, combinations thereof, and so forth, just to name a few examples. In certain example implementations, information integration system 702 may be implemented in the context of a WWW search system. Also in certain example implementations, information integration system 702 may be implemented in the context of private enterprise networks (e.g., intranets) and/or at least one public network formed from multiple networks (e.g., the "Internet"). Information integration system 702 may also operate in other contexts, such as a local hard drive and/or home network.

As illustrated in FIG. 7, information integration system 702 may be operatively coupled to network resources 708 and/or communications network 704. An end user 108 may communicate with information integration system 702 via communications network 704 using user resources 706. For example, user 108 may wish to search for web documents related to a certain topic of interest. User 108 may access a search engine website and submit a search query. User 108 may utilize user resources 706 to accomplish this search-related task. User resources 706 may comprise a computer (e.g., laptop, desktop, netbook, etc.), a personal digital assistant (PDA), a so-called smart phone with access to the Internet, a gaming machine (e.g., console, hand-held, etc.), an entertainment appliance (e.g., television, set-top box, e-book reader, etc.), a combination thereof, and so forth, just to name a few examples.

User resources 706 may permit a browser 718 to be executed thereon. Browser 718 may be utilized to view and/or otherwise access web documents from the Internet. A browser 718 may be a standalone application, an application that is embedded in or forms at least part of another program or operating system, and so forth. User 108 may provide a search query 112 (of FIGS. 1 and 5) to information integration system 702 over communication network 704 from browser 718 of user resources 706 and/or directly at information integration system 702 (e.g., bypassing communication network 704).

User resources 706 may also include and/or present a user interface 720. User interface 720 may include, for example, an electronic display screen and/or various user input or output devices. User input devices may include, for example, a microphone, a mouse, a keyboard, a pointing device, a touch screen, a gesture recognition system (e.g., camera or other sensor), combinations thereof, and so forth, just to name a few examples. Output devices may include, for example, a display screen, speakers, tactile feedback/output systems, some combination thereof, and so forth, just to name a few examples.

In an example operational scenario in a WWW context, user 108 may access a website offering access to a search engine and submit a search query. A search query 112 (of FIGS. 1 and 5) may be transmitted from user resources 706 to information integration system 702 via communications network 704. In response, information integration system 702 may determine a list of web documents that is tailored based at least partly on relevance to the search query. Information integration system 702 may transmit such a list as search results 114 (of FIGS. 1 and 5) back to user resources 706 for display to user 108, for example, on user interface 720.

Generally, an information integration system 702 may include a crawler 710 to access network resources 708, which may include, for example, the Internet (e.g., the WWW) or other network(s), one or more servers, at least one data repository, combinations thereof, and so forth, just to name a few examples of sources of objects 102 (of FIGS. 1 and 5). Information integration system 702 may also include at least one database 712 and search engine 104 that is supported, for example, by search index 106. Information integration system 702 may further include one or more processors 714 and/or one or more controllers to implement various modules that comprise processor-executable instructions for a special-purpose computing device. An example of processor-executable instructions is ranking function production instructions 716, which may produce trained versions of ranking functions when executed by a processor to thereby form a special purpose computing device. Ranking function production instructions 716 may be localized and executed on one device or distributed and executed on multiple devices. Ranking function production instructions 716 may also be partially or fully executed by user resources 706 (e.g., as part of a "desktop" or local search tool).

In an example web-oriented implementation, crawler 710 may be adapted to locate web documents such as, for example, web documents associated with websites. Many different crawling algorithms are known and may be adopted by crawler 710. Crawler 710 may also follow one or more hyperlinks associated with a web document to locate other web documents. Upon locating a web document, crawler 710 may, for example, store the web document's uniform resource locator (URL) and/or other information from or about the web document in database 712 and/or search index 106. Crawler 710 may store, for instance, all or part of a web document's content (e.g., HTML or XML data, image data, video, embedded links, other objects, metadata, etc.) in database 712.

Figure 8:
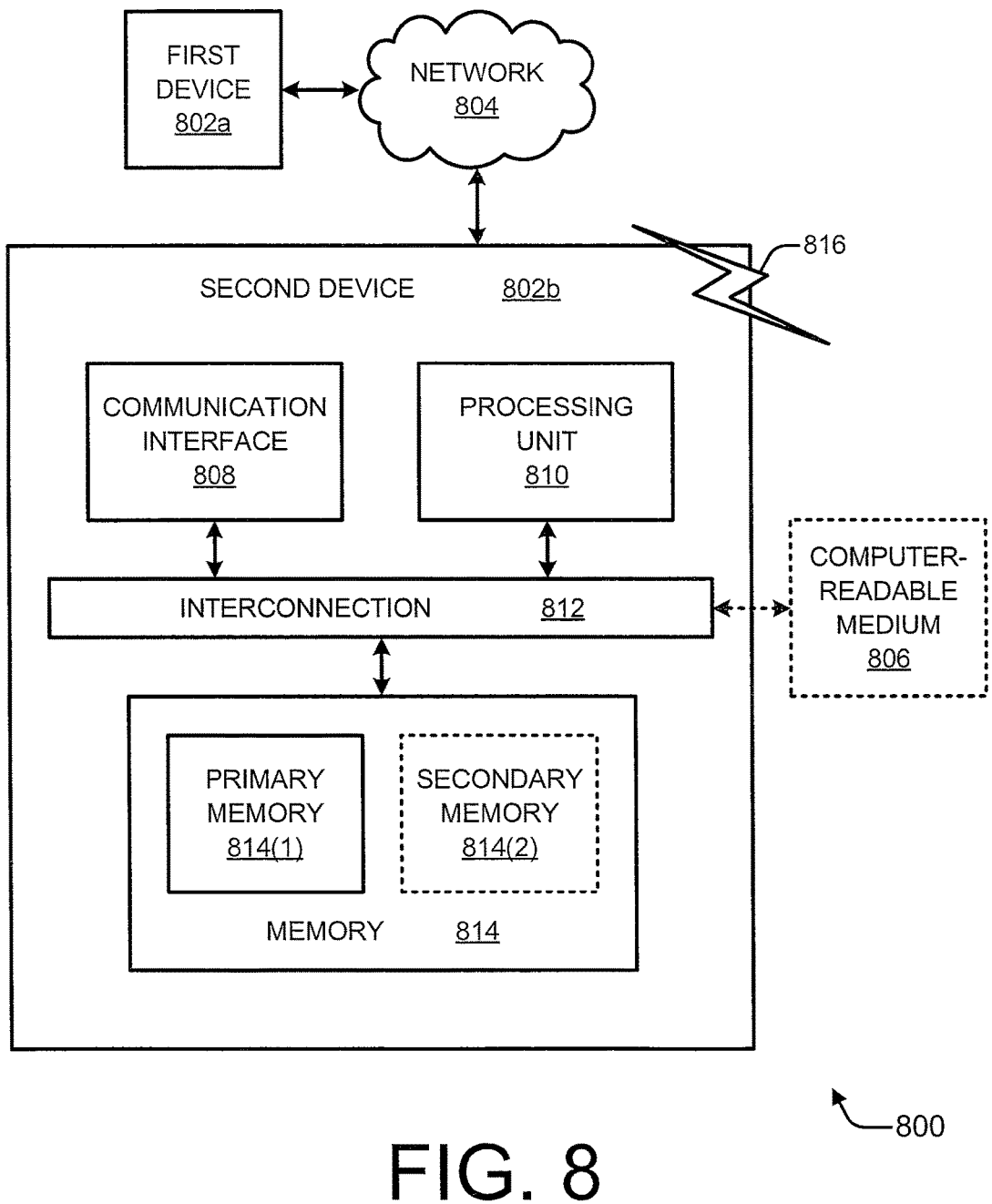
FIG. 8 is a block diagram of example devices, according to an embodiment, that may be configured into special purpose computing devices that implement aspects of one or more of the embodiments that are described herein relating to ranking functions for multiple domains.

FIG. 8 is a block diagram 800 of example devices 802 that may be configured into special purpose computing devices that implement aspects of one or more of the embodiments that are described herein relating to ranking functions for multiple domains according to an embodiment. As illustrated, block diagram 800 includes a first device 802a and a second device 802b, which may be operatively coupled together through one or more networks 804. Devices 802 may correspond to, implement, or otherwise realize information integration system 702 (of FIG. 7), user resources 706, and so forth. Network 804 may correspond to communication network 704 (of FIG. 7). Block diagram 800 also illustrates at least one electrical digital signal 816.

For certain example embodiments, first device 802a and second device 802b, as shown in FIG. 8, may be representative of any device, appliance, machine, combination thereof, etc. (or multiple ones thereof) that may be configurable to exchange data over network 804. First device 802a may be adapted to receive an input from a user. By way of example but not limitation, first device 802a and/or second device 802b may comprise: one or more computing devices and/or platforms, such as, e.g., a desktop computer, a laptop computer, a workstation, a server device, etc.; one or more personal computing or communication devices or appliances, such as, e.g., a personal digital assistant (PDA), a mobile "smart" phone, a mobile communication device, a netbook, etc.; a computing system and/or associated service provider capability, such as, e.g., a database or data storage service provider/system, a network service provider/system, an Internet or intranet service provider/system, a portal and/or search engine service provider/system, a wireless communication service provider/system; any combination thereof; and so forth, just to name a few examples.

Network 804, as shown in FIG. 8, is representative of one or more communication links, processes, and/or resources configurable to support the exchange of data between first device 802a and second device 802b. By way of example but not limitation, network 804 may include wireless and/or wired communication links, telephone or telecommunications systems, data buses or channels, optical fibers, terrestrial or satellite resources, local area networks, wide area networks, intranets, the Internet, routers or switches, public or private networks, combinations thereof, and so forth, just to name a few examples.

All or part of the various devices and networks shown in block diagram 800, as well as the other apparatuses and the other processes and methods that are further described herein, may be implemented using or otherwise include hardware, firmware, software, discrete/fixed logic circuitry, any combination thereof, and so forth. As illustrated, but by way of example only, second device 802b includes a communication interface 808, one or more processing units 810, an interconnection 812, and at least one memory 814. Memory 814 includes primary memory 814(1) and secondary memory 814(2). Second device 802b has access to at least one computer-readable medium 806. Although not explicitly shown, first device 802a may also include any of the components illustrated for second device 802b.

Thus, by way of an example embodiment but not limitation, second device 802b may include at least one processing unit 810 that is operatively coupled to memory 814 through interconnection 812 (e.g., a bus, a fibre channel, a local/storage area network, etc.). Processing unit 810 is representative of one or more circuits configurable to perform at least a portion of a data computing procedure or process. By way of example but not limitation, processing unit 810 may include one or more processors, controllers, microprocessors, microcontrollers, application specific integrated circuits (ASICs), digital signal processors (DSPs), programmable logic devices, field programmable gate arrays (FPGAs), any combination thereof, and so forth, just to name a few examples.

Memory 814 is representative of any data storage mechanism. Memory 814 may include, for example, a primary memory 814(1) and/or a secondary memory 814(2). Primary memory 814(1) may include, for example, a random access memory, a read only memory, combinations thereof, and so forth. Although illustrated in this example as being separate from processing unit 810, it should be understood that all or a part of primary memory 814(1) may be provided within or otherwise co-located with/coupled directly to processing unit 810 (e.g., as a cache or other tightly-coupled memory).

Secondary memory 814(2) may include, for example, the same or similar types of memory as the primary memory and/or one or more data storage devices or systems. Data storage devices and systems may include, for example, a disk drive or array thereof, an optical disc drive, a tape drive, a solid state memory drive (e.g., flash memory, phase change memory, etc.), a storage area network (SAN), combinations thereof, and so forth. In certain implementations, secondary memory 814(2) may be operatively receptive of, comprised partly of, and/or otherwise configurable to couple to computer-readable medium 806. Computer-readable medium 806 may include, for example, any medium that can store, carry, and/or make accessible data, code, and/or instructions for execution by one or more of the devices in block diagram 800.

According to an embodiment that includes a memory device, one or more portions of memory 814 may store signals representative of data and/or information as expressed by a particular state of memory 814. For example, an electronic signal representative of data and/or information may be "stored" in a portion of a memory device by affecting or changing the state of such portions of memory 814 to represent data and/or information as binary information (e.g., ones and zeros). As such, in a particular implementation, such a change of state of the portion of memory to store a signal representative of data and/or information constitutes a transformation of memory 814 to a different state or thing.

Second device 802b may also include, for example, communication interface 808 that provides for or otherwise supports the operative coupling of second device 802b to at least network 804. By way of example but not limitation, communication interface 808 may include a network interface device or card, a modem, a router, a switch, a transceiver, combinations thereof, and so forth, just to name a few examples. Electrical digital signal(s) 816 may be manipulated by second device 802b. By way of example but not limitation, electrical digital signals 816 may be received from and/or transmitted onto network 804 using communication interface 808. Also, electrical digital signals 816 may be stored to and/or read from memory 814 using interconnection 812.

Some portion(s) of this Detailed Description are presented in terms of algorithms or symbolic representations of operations on electrical digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by persons of ordinary skill in the signal processing, computational, or related arts to convey the substance of their work to others skilled in the art. An algorithm is here, and generally, considered to be a self-consistent sequence of operations or similar signal processing leading to a desired result. In this context, operations or processing involve physical manipulations of physical quantities. Typically, although not necessarily, such quantities may take the form of electrical or magnetic (e.g., binary) signals capable of being stored, transferred, combined, compared, or otherwise manipulated.

It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as is apparent from the preceding discussion, it is to be appreciated that throughout this Specification descriptions utilizing terms such as "processing," "computing," "calculating," "identifying," "training," "storing," "obtaining," "performing," "ranking," "blending," "determining," "generating," or the like refer to actions, operations, or processes of a specific apparatus, such as a special purpose computer or a similar special purpose electronic computing device. In the context of this Specification, therefore, a special purpose computer or a similar special purpose electronic computing device is capable of using at least one processing unit to manipulate or transform signals, which are typically represented as physical electronic/electrical or magnetic quantities within memories, registers, or other information storage devices; transmission devices; display devices; etc. of the special purpose computer or similar special purpose electronic computing device.

While certain exemplary techniques have been described and shown herein using various methods, apparatuses, systems, etc., it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method for producing ranking functions for multiple on-line domains via a local computing device, the method comprising:
processing one or more electrical digital signals comprising a history of user selections of items of content received from a remote computing device via a computing network;
jointly training, via a pairwise machine-learning iterative process, a plurality of ranking functions for content from a plurality of domains, wherein the jointly training comprises:
identifying, for the plurality of domains, a first domain comprising objects having one or more first features of a first set of features and a second domain comprising objects having one or more second features of a second set of features, wherein at least one feature of the first set of features is excluded from the second set of features;
selecting sample items of content based, at least in part, on the history of user selections of the items of content;
executing the plurality of ranking functions to determine relevance scores for the selected sample items of content;
reducing an inter-domain pairwise loss indicating an incorrect relative rank with respect to two or more of the sample items of content ranked by at least two of the plurality of ranking functions between or among at least two domains of the plurality of domains based, at least in part, on the relevance scores; and
storing electrical digital signals representative of the plurality of ranking functions in at least one memory.

2. The method of claim 1, further comprising determining the inter-domain loss between or among the at least two domains of the plurality of domains with regard to the incorrect relative ranking for at least two sample items that correspond to different domains of the plurality of domains.

3. The method of claim 2, further comprising determining the inter-domain loss using intermediate versions of the plurality of ranking functions to refine the plurality of ranking functions during the training.

4. The method of claim 1, further comprising obtaining first electrical digital signals representative of a search query submitted by a user; and
ranking a plurality of search results, which correspond to the search query, using trained versions of the plurality of ranking functions.

5. The method of claim 4, further comprising performing the search query based, at least in part, on the search query across the plurality of domains to ascertain the plurality of search results that correspond to the search query from the plurality of domains;
wherein the ranking of the plurality of search results associates a plurality of relevance scores with the plurality of search results.

6. The method of claim 5, further comprising transmitting second electrical digital signals representative of at least a portion of a single ranked list of the plurality of search results to the user.

7. The method of claim 1, further comprising training the plurality of ranking functions for the plurality of domains using a support vector machine (SVM) framework for realizing a machine learning algorithm.

8. The method of claim 1, wherein the plurality of ranking functions comprise forests of trees that are grown in accordance with a gradient boosting decision tree (GBDT) framework; and further comprising iteratively growing trees for a forest corresponding to at least one particular ranking function of the plurality of ranking functions based on trees for one or more other forests corresponding to one or more other ranking functions of the plurality of ranking functions.

9. The method of claim 1, further comprising the calculating a plurality of gradients for the plurality of ranking functions responsive to a blending loss function comprised of contributions related to at least one kind of pair; the at least one kind of pair including an item and a counterpart item that is of lower relevance in comparison to the item, or an item and a counterpart item that is of equal or greater relevance in comparison to the item; wherein the item belongs to a first domain of the plurality of domains, and the counterpart item belongs to a second domain of the plurality of domains.

10. The method of claim 1, wherein the jointly training, via the pairwise machine-learning iterative process, of the plurality of ranking functions for the plurality of domains jointly is performed via a same iteration of the pairwise machine-learning iterative process.

11. A system to produce ranking functions for multiple on-line domains, the system comprising:
a remote computing device to transmit, via a computer network, one or more electrical digital signals to comprise a history of user selections of items of content;
a local computing device to process the electrical digital signals comprising the history of user selections of the items of content and to execute computer instructions on at least one processor to jointly train, via a pairwise machine-learning iterative process, a plurality of ranking functions for content from a plurality of domains, wherein to jointly train is to:
identify, for the plurality of domains, a first domain to comprise objects to have one or more first features of a first set of features and a second domain to comprise objects to have one or more second features of a second set of features, wherein at least one feature of the first set of features is excluded from the second set of features;
select sample items of content to be based, at least in part, on the history of user selections of the items of content;
execute the plurality of ranking functions to determine relevance scores for the selected sample items of content;
reduce an inter-domain pairwise loss to indicate an incorrect relative rank with respect to two or more of the sample items of content to be ranked by at least two of the plurality of ranking functions between or among at least two domains of the plurality of domains to be based, at least in part, on the relevance scores; and
store electrical digital signals to be representative of the plurality of ranking functions in at least one memory.

12. The system of claim 11, wherein a formulation of the inter-domain loss is to reflect the incorrect rank with respect to at least two sample items to correspond to different domains of the plurality of domains.

13. The system of claim 11, wherein the first domain to associate with at least one feature that is to not associate with the second domain.

14. The system of claim 11, wherein the at least two domains are to associate with one or more features to be at least correlated between or among the at least two domains.

15. The system of claim 14, wherein the computer instructions are further executable on the at least one processor to model correlations between or among common features and heterogeneous features to associate with the plurality of domains during the training of the plurality of ranking functions to refine the plurality of ranking functions.

16. The system of claim 11, wherein the computer instructions are further executable on the at least one processor to train the plurality of ranking functions for the plurality of domains based, at least in part, on intra-domain loss within the plurality of domains.

17. The system of claim 11, further comprising at least one communication interface to at least transmit electrical digital signals onto a communication network; and
    wherein the computer instructions are further executable on the at least one processor to:
        rank a plurality of search results via trained versions of the plurality of ranking functions via association of a plurality of relevance scores with the plurality of search results;
        blend the plurality of search results into a single ranked list; and
        transmit electrical digital signals to be representative of at least a portion of the single ranked list of the plurality of search results toward a user via the at least one communication interface.

18. A method for producing ranking functions for multiple on-line domains via a local computing device, the method comprising:
    processing one or more electrical digital signals comprising a history of user selections of items of content received from a remote computing device via a computing network:
    jointly training, via a pairwise machine-learning iterative process, a plurality of ranking functions for content from a plurality of domains, wherein the jointly training comprises:
        obtaining first electrical digital signals representative of a search query submitted by a user;
        executing a plurality of ranking functions to determine relevance scores for selected sample items of content for a plurality of domains;
        reducing an inter-domain pairwise loss indicating an incorrect relative rank with respect to two or more of the sample items of content ranked by at least two of the plurality of ranking functions between or among at least two domains of the plurality of domains based, at least in part, on the relevance scores;
        ranking a plurality of search results, corresponding to the search query, using the plurality of ranking functions by associating the relevance scores with the plurality of search results; and
        blending the plurality of search results into a single ranked list using the plurality of relevance scores that are associated with the plurality of search results.

19. The method of claim 18, further comprising blending the plurality of search results into the single ranked list using un-normalized versions of the plurality of relevance scores by implementing a simple sort of the plurality of search results based on the un-normalized versions of the plurality of relevance scores.

20. The method of claim 18, further comprising:
    performing a search based, at least in part, on the search query across the plurality of domains to ascertain the plurality of search results that correspond to the search query from objects corresponding to the plurality of domains; and
    transmitting second electrical digital signals representative of at least a portion of the single ranked list of the plurality of search results to the user.

21. The method of claim 18, further comprising:
    training the plurality of ranking functions for the plurality of domains using sample items that are associated with preference content and based, at least in part, on the inter-domain loss between or among the at least two domains of the plurality of domains; and
    storing second electrical digital signals representative of the plurality of ranking functions in one or more memories.

\* \* \* \* \*